(No Model.) 2 Sheets—Sheet 1.
A. J. H. REID.
PLANTER AND FERTILIZER DISTRIBUTER.
No. 554,729. Patented Feb. 18, 1896.
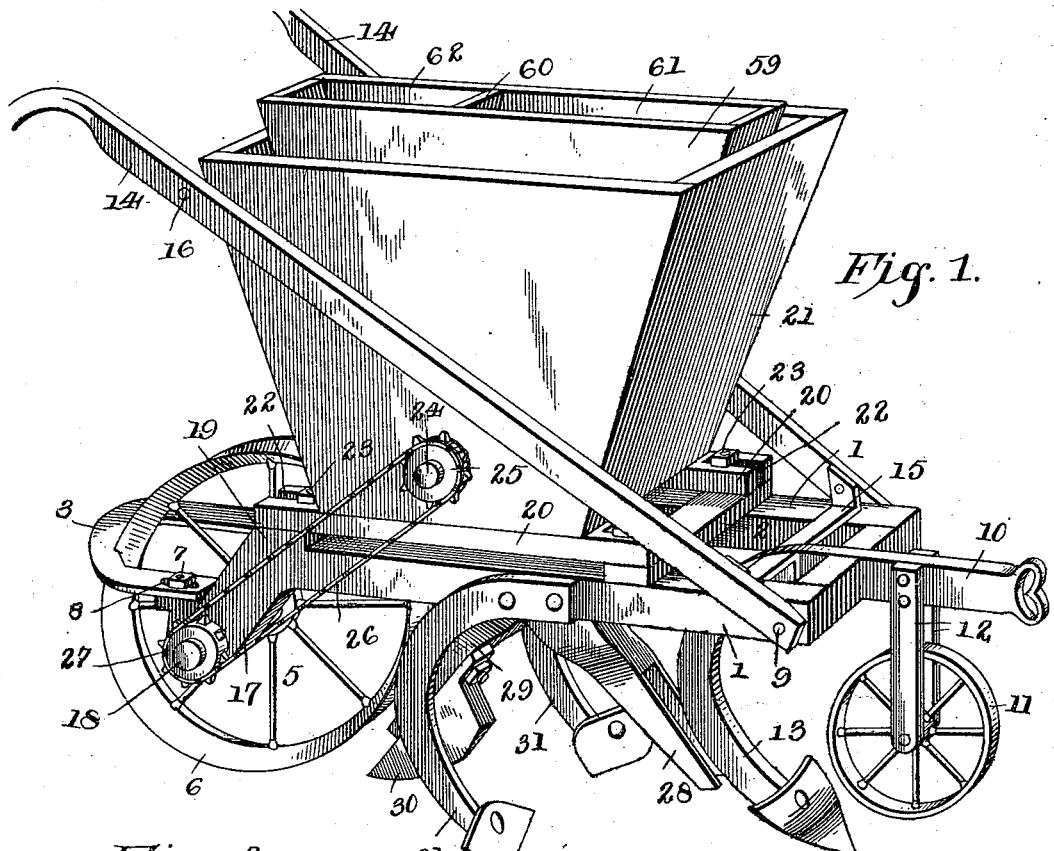
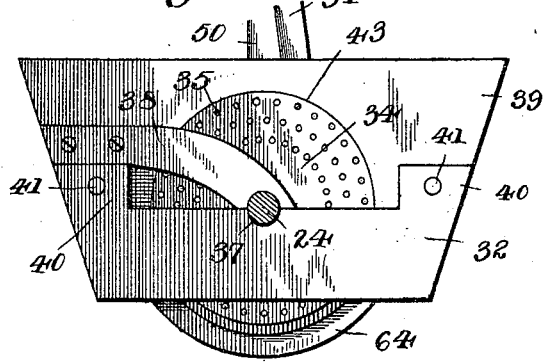
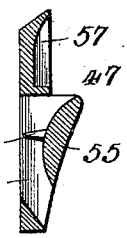
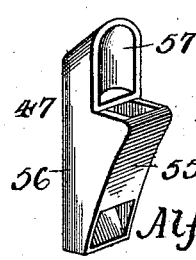
Witnesses
Chas. A. Ford.
W. B. Hudson
Inventor
Alfred J. H. Reid,
By his Attorneys,
C. A. Snow & Co.

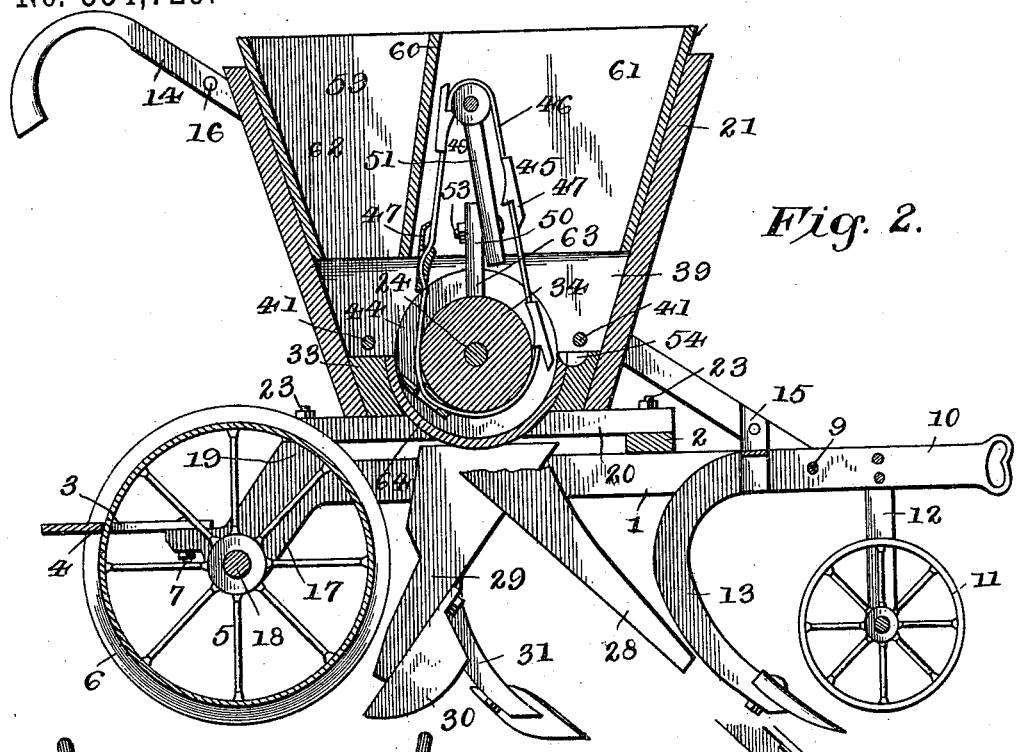

UNITED STATES PATENT OFFICE.

ALFRED JERE HORN REID, OF HENDERSON, TENNESSEE.

PLANTER AND FERTILIZER-DISTRIBUTER.

SPECIFICATION forming part of Letters Patent No. 554,729, dated February 18, 1896.

Application filed August 19, 1895. Serial No. 559,831. (No model.)

*To all whom it may concern:*

Be it known that I, ALFRED JERE HORN REID, a citizen of the United States, residing at Henderson, in the county of Chester and State of Tennessee, have invented a new and useful Planter and Fertilizer-Distributer, of which the following is a specification.

My invention relates to combined planters and fertilizer-distributers, and has for its object to provide a simple and efficient construction and arrangement of parts whereby the simultaneous planting of one or more kinds of seed and a fertilizing material is facilitated, the planting of corn and peas being accomplished by a feed mechanism constructed to control the discharge thereof and distribute the seed uniformly in drills.

Further objects and advantages of this invention will appear in the following description, and the novel features thereof will be particularly pointed out in the appended claims.

In the drawings, Figure 1 is a perspective view of a planter and fertilizer-distributer constructed in accordance with my invention. Fig. 2 is a longitudinal vertical section of the same. Fig. 3 is a transverse vertical section. Fig. 4 is a side view of the seed-planting mechanism. Fig. 5 is a detail view in perspective of one of the receptacles of the endless belt. Fig. 6 is a longitudinal section of one of the receptacles of the endless belt. Fig. 7 is a transverse section in the plane of the operating-shaft. Fig. 8 is a detail view of the yoke detached. Fig. 9 is a similar view of the separating-frame detached. Fig. 10 is a detail view of the locking-beam and contiguous parts of the frame.

Similar numerals of reference indicate corresponding parts in all the figures of the drawings.

The frame of the planter comprises parallel side beams 1, connected near their front ends by a transverse bar 2 and at their rear ends by a yoke 3, constructed at an intermediate point to form a shoe or scraper 4 for operation in connection with the ground-wheel 5, said ground-wheel having a V-shaped periphery 6 to act as a roller and compress the soil after the introduction of the seed into the drill. The arms of the yoke are secured to the rear ends of the side beams by means of bolts 7, which extend through elongated openings or slots 8 in said arms to provide for the forward and rearward adjustment of the shoe or scraper to bear properly against the surface of the wheel.

Upon a transverse bolt 9 extending horizontally between the front extremities of the side beams 1 is swiveled a rocking beam 10 extending in front and in rear of said bolt, said beam in advance of the bolt carrying the marker or colter-wheel 11, of which the supporting-arms 12 are secured to the beam, and carrying in rear of said bolt a standard 13 for a furrow-opening shovel; also journaled at their front ends upon the extremities of said transverse bolt 9 contiguous to the outer surfaces of the side beams are the handle-bars 14, and said handle-bars are connected at intermediate points with the rocking beam 10 in rear of its pivotal point by means of straps or braces 15, whereby the rocking beam may be moved to elevate or depress the marker or colter-wheel by depressing or elevating the rear ends of the handle-bars. The handle-bars are connected near their rear ends by a brace-rod 16.

The side beams are provided near their rear ends and above the bearings 17 for the shaft 18 of the ground-wheel with elevated rests 19, the upper surfaces of which are in a common horizontal plane with the upper surface of the transverse bar 2, and seated upon said rests and transverse bar are the base-bars 20 of the hopper 21, said base-bars extending forwardly and rearwardly beyond the inclined end walls of the hopper. These extensions of the base-bars are longitudinally slotted, as shown at 22, for engagement by vertical bolts 23 rising vertically from the rests 19 and cross-bar 2, and mounted in bearings in the opposite side walls of the hopper is an operating-shaft 24, provided at one end outside of the hopper with a chain-wheel 25, which is connected by means of a chain 26 with a similar wheel 27 on the shaft 18.

Arranged beneath the parallel-sided space or opening in the bottom of the hopper between the base-bars 20 are the forwardly and rearwardly inclined chutes 28 and 29, the former of which is adapted to convey fertilizing material to a point in rear of the furrow-opening shovel, while the latter is adapted to convey seed to a point in advance of the furrow-closing roller or wheel 5, the chute 29 serving the additional function of a standard and supporting the drill-blade 30, which opens a drill after the fertilizing material has been partly covered by the side furrow-closing shovels supported by the standards 31. The longitudinal adjustment of the hopper 21 upon the frame by reason of the slotted extensions of the base-bars 20 is designed to facilitate the adjustment of the tension of the chain 26, by which motion is communicated from the wheel or roller 5 to the operating shaft or spindle 24.

Arranged within the main hopper 21 and resting upon the base-bars 20 is a separating-frame having side bars 32 connected at their extremities by end blocks 33 to form a parallel-sided feed-opening, which is located above and communicates with the upper enlarged ends of the seed-chutes 28 and 29, said enlarged upper ends of the seed-chutes being elongated longitudinally of the frame and being arranged transversely opposite and contiguous to each other, whereby the inlet ends of both of the chutes are under the elongated opening of the separating-frame. Fixed to the shaft 24, between the planes of the side bars 32, is a feed-wheel 34, approximately equal in width to the interval between the side bars 32, and projecting laterally from the side faces of the feed-wheel are spurs or teeth 35, which operate in and pass through feed openings or channels 36 in the inner surfaces of the side bars 32 to engage the contents of the hopper at opposite sides of the separator-frame and convey it downward through the feed openings or channels to the plane of the lower surface of the separator-frame. At this point the fertilizer or other material is dropped into one of the chutes and is thence conveyed to the planting-point.

The shaft 24 rests in half-bearings 37 in the upper sides of the side bars 32, and removable bearing-caps 38 are employed to close the upper sides of the half-bearings 37 and prevent the vertical vibration of the shaft, said bearing-caps being carried by parallel plates 39 which rise from the upper edges of the side bars 32 and terminate at their extremities in contact with the inner surfaces of the end walls of the main hopper 21. Said side plates fit between terminal blocks 40 rising from the side bars 32, and are secured to said blocks by means of transverse bolts or pins 41. Hence by withdrawing the bolts or pins and removing the side plates 39, which carry the bearing-caps 38, the feed-wheel and shaft are free to be dismounted. The inner surfaces of the side plates 39 slightly overlap the side faces of the feed-wheel, and said feed-wheel is peripherally rabbeted to form shoulders 42, which are arranged in contact with semicircular inlet-openings 43 formed in the side plates 39, whereby the spurs or teeth on the side faces of the feed-wheel are exposed above the plane of the upper edges of the side bars 32 to engage the material in the hopper.

The periphery of the feed-wheel between the planes of the inner surfaces of the side plates 39 is cut away to form a channel-guide 44 traversed by a feed-belt or carrier 45 consisting of an endless band 46 and a series of spaced receptacles 47. Said belt or carrier also extends over a guide-pulley 48 arranged above the plane of the upper edges of the side plates 39, said pulley being supported by an extension-standard 49 comprising a fixed member 50 secured between the side plates 39 and an adjustable member 51 longitudinally slotted, as at 52, and held at the desired adjustment by a bolt 53. The upper end of the adjustable member of the standard is bifurcated to receive said pulley.

Motion is communicated to the carrier-belt or conveyer from the feed-wheel, and as the receptacles pass through the space between the side plates in rear of the feed-wheel they engage the seed and convey it over the upper guide-pulley and discharge it into the space between the side plates in advance of the standard. The space between the side plates in advance of the feed-wheel is closed by the block between the front extremities of the side bars 32 to form a floor in which is constructed an outlet-opening 54 communicating with one of the chutes. Thus the space between the side plates in rear of the feed-wheel forms a seed-holding pocket from which the seed is removed by the carrier or conveyer as the receptacles of said carrier pass therethrough, and the space in advance of the feed-wheel forms a seed-receiving pocket from which the seed is conveyed through the outlet-opening to the chute.

The construction of the seed-receptacle which I prefer to employ in connection with the carrier or conveyer consists of a keeper 55 extending inwardly from a loop 56, which is integral with the spoon or bowl 57, the concave side of said spoon or bowl being toward the belt which passes through the keeper 55 and is secured in place by means of a spur 58 on the convex side of the keeper. A receptacle which is upon a straight portion of the belt is held with the concave side of its spoon or bowl in contact, approximately, with the surface of the belt, whereby the seed contained therein is prevented from escape, whereas a receptacle which is upon a portion of the belt traversing one of the pulleys is deflected from the surface of the belt by the curvature of the periphery of the pulley to open the concave side of the spoon or bowl and thus allow the receptacle to receive or discharge the seed. Thus as the receptacles are carried around the lower or feed wheel the spoons or bowls thereof engage the seed in the holding-pocket and are then drawn toward the plane of the belt to prevent the escape of the seed, and as the receptacles pass over the upper pulley the spoons or bowls are again deflected and the seed is dropped into the receiving-pocket.

Arranged within the main hopper and communicating with the seed holding and receiving pockets, respectively, in rear and in front of the feed-wheel, is an auxiliary or intermediate hopper 59 provided at an intermediate point with a partition 60 forming front and rear compartments 61 and 62, which communicate, respectively, with the seed-receiving and seed-holding pockets. In order to prevent seed from passing from the seed-holding to the seed-receiving pocket without being conveyed by the carrier, I employ a guard 63 arranged between the plates 39 and constructed at its extremity to interlock with the periphery of the feed-wheel or fit the cross-sectional configuration thereof. In the construction illustrated said guard consists of the lower extremity of the fixed member 50 of the standard. In connection with the above-described construction I also employ an arc-shaped dividing web or guard 64, arranged longitudinally in the opening between the side bars and end blocks of the separating-frame to prevent seed from escaping from the seed-holding pocket through the guide-channel in the periphery of the feed-wheel, said web or guard being supported by the end blocks of the supporting-frame. The portions of the feed-wheel spindle between the side plate 39 and the side walls of the main hopper are provided with agitating-arms 65.

In practice, corn or peas are placed in the seed-hopper 62 communicating with the seed-holding pocket, and discharged by means of the carrier in the manner above explained, while fertilizer and cotton-seed are placed, respectively, in the portions of the main hopper upon the right and left hand sides of said intermediate or auxiliary hopper, whereby the fertilizer and cotton-seed are discharged by means of the spurs or teeth carried by the side faces of the feed-wheel in a manner also explained hereinbefore. The function of the extensible standard 50 51 is to adjust the guide-pulley to secure the desired tension of the carrier or conveyer belt.

Various changes in the form, proportion, and the minor details of construction may be resorted to without departing from the spirit or sacrificing any of the advantages of this invention.

Having described my invention, what I claim is—

1. In a machine of the class described, the combination with a frame and side beams, of a rocking beam fulcrumed at an intermediate point between the planes of the side beams and carrying a marking-wheel or colter and a furrow-opening plow-standard, respectively, in front and in rear of its pivotal point, handle-bars connected to the rocking beam, and planting mechanism, substantially as specified.

2. The combination with a frame having side beams, of a rocking beam arranged to swing in a vertical plane, a colter or marking-wheel and a furrow-opening plow-standard carried by said rocking beam, respectively, in front and in rear of its pivotal point, pivotal handle-bars, rigid connections between the handle-bars and the rocking beam, and planting mechanism, substantially as specified.

3. The combination with a supporting-frame and furrow opening and closing devices, of a hopper provided in its bottom with an outlet or opening, a separator-frame arranged in the hopper and having an opening communicating with an opening in the bottom of the hopper, a dividing web or guard arranged longitudinally in said opening in the separating-frame, a feed-wheel having a peripheral guide-channel which is closed at the lower side by said dividing web or guard, vertical plates arranged contiguous to the planes of the side faces of the feed-wheel to divide the interior of the hopper into side and intermediate compartments, spurs or teeth carried by the faces of the feed-wheel and operating in openings in said side plates to engage material in the side compartments and convey it through outlet openings or channels in the sides of the separating-frame, an elevated guide-pulley, and an endless carrier or conveyer traversing said feed-wheel and pulley, substantially as specified.

4. The combination of a supporting-frame and furrow opening and closing devices, of a hopper, a frame arranged in the hopper and having parallel side bars provided in their inner faces with outlet openings or channels, a feed-wheel arranged between the planes of said side bars and provided with lateral spurs or teeth operating in said outlet openings or channels, said feed-wheel having a peripheral guide-channel, side plates rising from the side bars of the separating-frame to divide the interior of the hopper into side and intermediate compartments, and an endless carrier or conveyer traversing the feed-wheel and provided with spaced receptacles, substantially as specified.

5. The combination with a supporting-frame and furrow opening and closing devices, of a hopper, a horizontal separating-frame arranged in the hopper, parallel side plates rising from the separating-frame and detachably secured thereon, a feed-wheel having its spindle mounted in bearings in the side bars of the separating-frame, bearing-caps carried by the side plates to secure the spindle in said bearings, an extensible standard rising from the side plates, spurs or teeth arranged upon lateral faces of the feed-wheel and operating in openings formed in the side plates, agitating-arms carried by the spindle, and an endless carrier or conveyer traversing the feed-wheel and a pulley supported by said extensible standard, substantially as specified.

6. In a planter, the combination with a feed-wheel, and means for communicating rotary motion thereto, of an endless carrier or conveyer having a belt traversing said feed-wheel and a guide-pulley, and seed-receptacles carried by the belt and having spoons or bowls open at their sides contiguous to the belt and adapted to be closed by the belt at points between the feed-wheel and pulley and to be open while traversing the feed-wheel and pulley, substantially as specified.

7. In a planter, the combination with a feed-wheel and means for communicating rotary motion thereto, of an endless carrier or conveyer having a belt traversing said feed-wheel and a guide-pulley, and seed-receptacles having loops 56, convexed keepers 55 provided with spurs engaging said belt, and hollow spoons or bowls 57 adapted to be closed by the belt in traversing the distance between the feed-wheel and pulley, substantially as specified.

In testimony that I claim the foregoing as my own I have hereto affixed my signature in the presence of two witnesses.

ALFRED JERE HORN REID.

Witnesses:
ALBERT A. ANDERSON,
JAMES F. BRAY.